United States Patent
Woodall, III et al.

[11] Patent Number: 6,142,142
[45] Date of Patent: Nov. 7, 2000

[54] METHOD, APPARATUS AND SYSTEM FOR SAFELY AND EFFICIENTLY CONTROLLING A VENTILATION HOOD

[75] Inventors: Miles Woodall, III, Dallas; Tom Kuhnke, Carrollton, both of Tex.

[73] Assignee: Vent-A-Hood, Richardson, Tex.

[21] Appl. No.: 09/292,234

[22] Filed: Apr. 15, 1999

[51] Int. Cl.$^7$ ............................................. F24C 15/20
[52] U.S. Cl. .................. 126/299 R; 55/408; 55/DIG. 36
[58] Field of Search .......................... 126/299 R, 299 D; 55/408, DIG. 36

[56] References Cited

U.S. PATENT DOCUMENTS

| | | |
|---|---|---|
| 2,077,496 | 4/1937 | Sonntag . |
| 2,182,106 | 12/1939 | Ames . |
| 2,226,641 | 12/1940 | Sonntag . |
| 2,341,245 | 2/1944 | Sonntag . |
| 2,349,668 | 5/1944 | Marker et al. . |
| 2,369,375 | 2/1945 | Sonntag . |
| 2,456,391 | 12/1948 | Davies . |
| 2,619,023 | 11/1952 | Kisling . |
| 2,633,071 | 3/1953 | Erickson . |
| 2,634,718 | 4/1953 | Williams . |
| 2,710,573 | 6/1955 | Marker . |
| 2,793,712 | 5/1957 | Graswich et al. ................... 126/299 R |
| 2,857,836 | 10/1958 | Bernstein . |
| 2,862,437 | 12/1958 | Smith et al. . |
| 2,868,108 | 1/1959 | Petersen . |
| 2,886,124 | 5/1959 | Scharmer . |
| 2,889,007 | 6/1959 | Lunde ................... 126/299 D |
| 2,893,305 | 7/1959 | Jenson et al. . |
| 3,064,551 | 11/1962 | Stalker . |
| 3,125,869 | 3/1964 | Winton . |
| 3,251,290 | 5/1966 | Jenson et al. . |
| 3,393,497 | 7/1968 | Donnelly ............................. 126/299 D |
| 3,496,704 | 2/1970 | Bandlow . |
| 3,589,266 | 6/1971 | Hike et al. . |
| 3,625,135 | 12/1971 | Carlson et al. . |
| 3,690,245 | 9/1972 | Ferlise et al. . |
| 3,834,295 | 9/1974 | Seidel . |
| 3,865,022 | 2/1975 | Ahlrich ............................. 55/DIG. 36 |
| 3,983,796 | 10/1976 | Ahlrich ............................. 55/DIG. 36 |
| 4,088,123 | 5/1978 | Bowen, Jr. et al. . |
| 4,089,328 | 5/1978 | Bergmark et al. ................... 126/299 D |
| 4,105,015 | 8/1978 | Isom . |
| 4,120,290 | 10/1978 | Bowen, Jr. et al. . |
| 4,121,199 | 10/1978 | Young . |
| 4,121,569 | 10/1978 | Bowen, Jr. et al. . |
| 4,122,835 | 10/1978 | Bowen, Jr. et al. . |
| 4,130,111 | 12/1978 | Ristic . |
| 4,133,300 | 1/1979 | Burton, Jr. et al. . |
| 4,146,016 | 3/1979 | Bowen, Jr. et al. . |
| 4,166,448 | 9/1979 | Miller et al. . |
| 4,235,220 | 11/1980 | Hepner . |
| 4,327,274 | 4/1982 | White et al. . |
| 4,741,257 | 5/1988 | Wiggin et al. . |
| 4,903,685 | 2/1990 | Melink . |
| 5,074,281 | 12/1991 | Fluhrer et al. . |
| 5,211,159 | 5/1993 | Lieblein et al. . |
| 5,421,320 | 6/1995 | Brown . |
| 5,642,784 | 7/1997 | Guay et al. . |
| 5,656,170 | 8/1997 | Henderson . |
| 5,690,093 | 11/1997 | Schrank et al. ..................... 126/299 D |
| 5,755,214 | 5/1998 | Lai . |

FOREIGN PATENT DOCUMENTS

| | | | |
|---|---|---|---|
| 2308973 | 11/1976 | France ............................... 126/299 R |
| 4-106346 | 4/1992 | Japan ................................. 126/299 D |
| 4-260740 | 9/1992 | Japan ................................. 126/299 D |

*Primary Examiner*—Ira S. Lazarus
*Assistant Examiner*—Sara Clarke
*Attorney, Agent, or Firm*—Sanford E. Warren, Jr.; Daniel J. Chalker; Gardere & Wynne, L.L.P.

[57] ABSTRACT

The present invention provides a method, apparatus and system for safely and efficiently controlling a ventilation hood having at least one blower unit disposed within a hood. The blower unit operates at a first speed which is substantially below a threshold speed when a speed controller is in a first setting and a sensor does not detect a trigger condition. The blower unit also operates at or above the threshold speed when the speed controller is in a first setting and the sensor detects the trigger condition. In addition, the blower unit operates at or above the threshold speed when the speed controller is in a second setting, and deactivates when the speed controller is in a third setting.

45 Claims, 5 Drawing Sheets

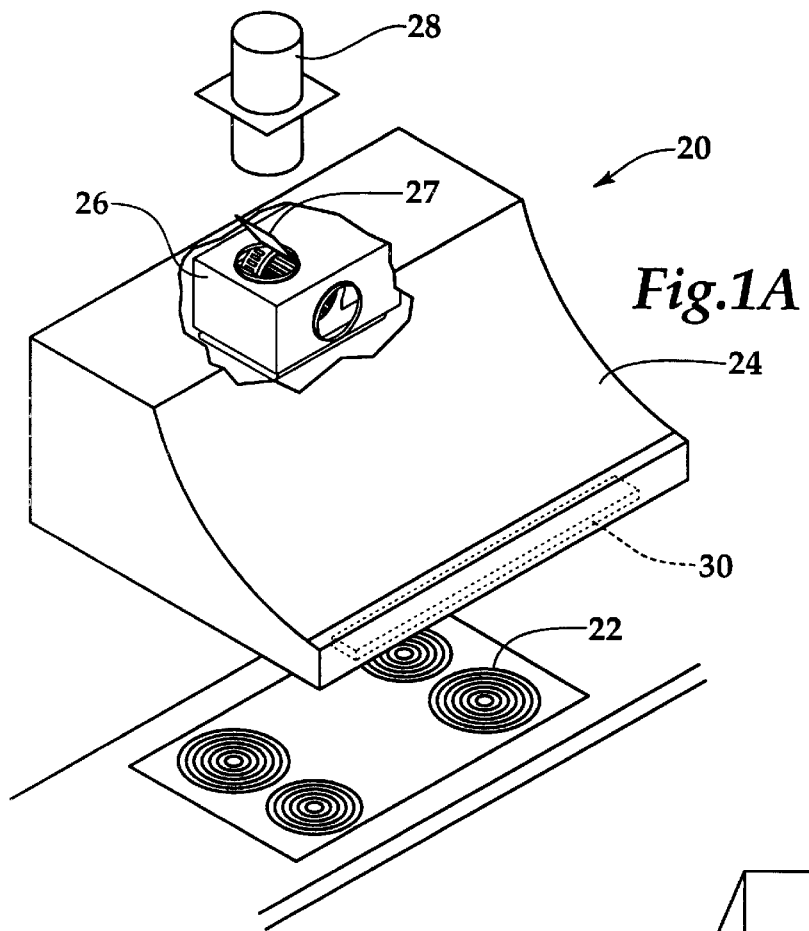
*Fig.1A*
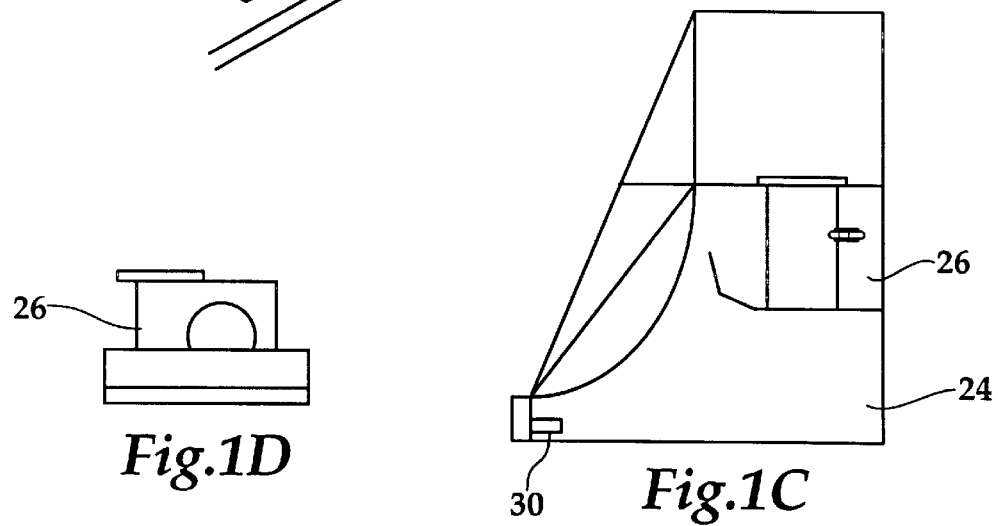
*Fig.1D*  *Fig.1C*
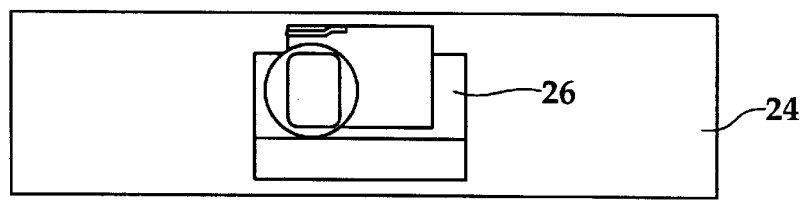
*Fig.1B*

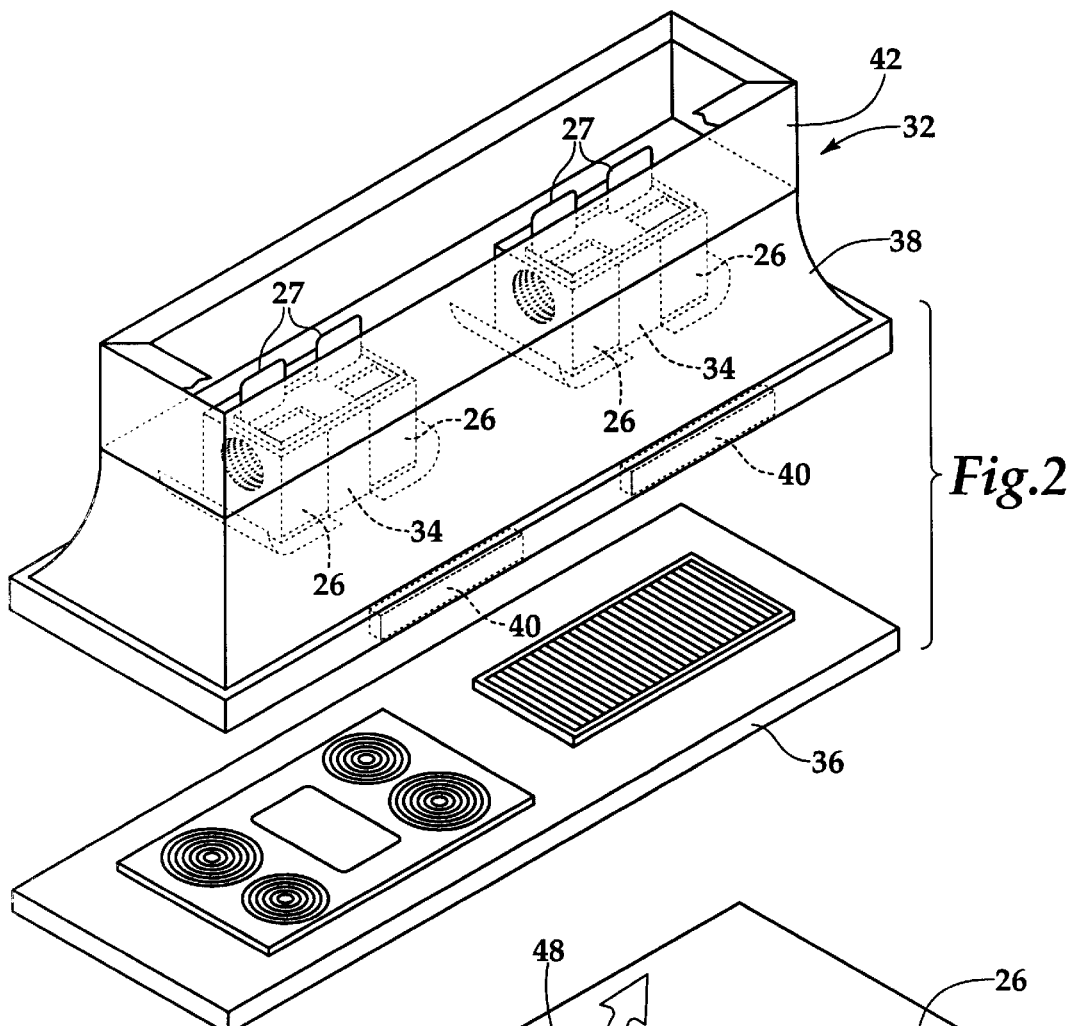
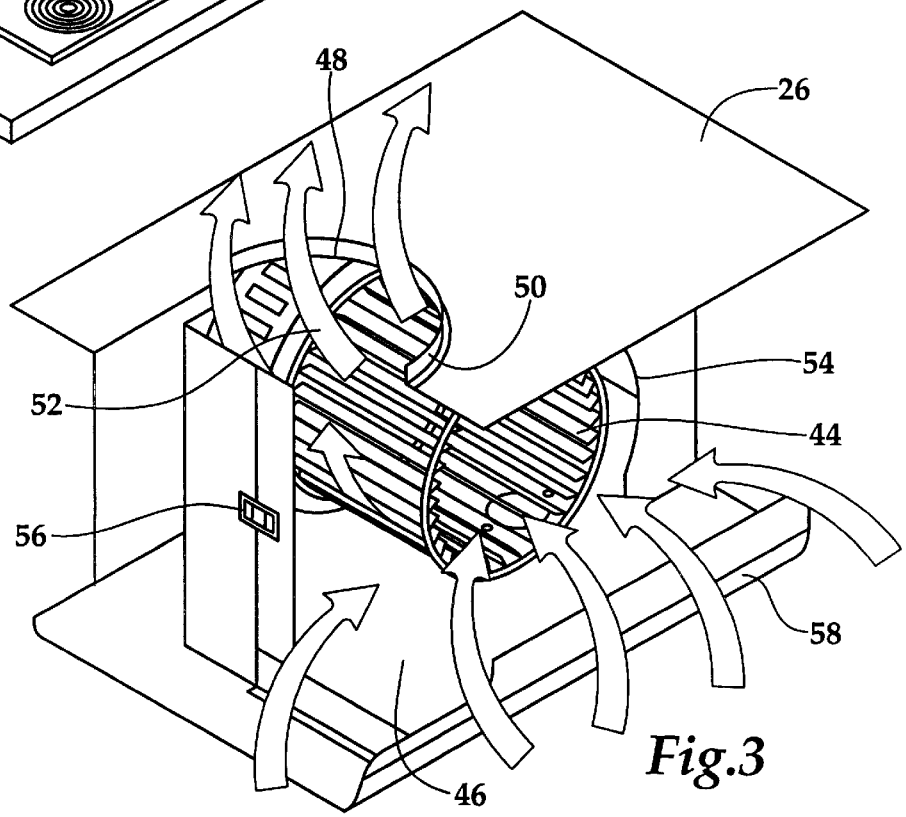

METHOD, APPARATUS AND SYSTEM FOR SAFELY AND EFFICIENTLY CONTROLLING A VENTILATION HOOD

FIELD OF THE INVENTION

The present invention relates generally to ventilation hoods and more specifically to a method, apparatus and system for safely and efficiently controlling a ventilation hood.

BACKGROUND OF THE INVENTION

Cooking creates undesirable by-products, such as heat, steam, grease and odors. These cooking by-products pollute the air in a home or commercial environment if they are not safely removed. These cooking by-products are irritating, harmful and potentially hazardous. Accordingly, a multitude of ventilation systems have been developed to draw the cooking by-products away from the immediate vicinity of the cooking area and to expel this contaminated air to an external environment through an exhaust duct.

The heat generated from cooking expands the air and rises, carrying with it the cooking by-products. These typical ventilation systems use a hood placed above the cooking area to capture the by-products prior to removal by a blower system. The hood is like a small room wherein too much air flow is as harmful as too little. If too much air is removed from a well insulated home a negative pressure results rendering the ventilation system ineffective unless expensive make-up air is introduced. As a result the blower system should be sized based on the expected usage of the cooking area. For example, a barbecue grill, or wok should be measured at full value because they are most often at the high setting. Multiple burners, however, are rarely all turned to the high setting at any one time and should be discounted. As a result blower systems are typically controlled by switches which allow the user to select the fan speed from a couple of choices.

But if the selected fan speed of the blower system is too low, the fan will under-exhaust allowing heat and/or cooking by-products to escape from the hood and into the kitchen and, perhaps, the rest of the facility. On the other hand, if the fan speed of the blower system is too high, the fan will over-exhaust allowing too much air to be expelled while the motor is consuming energy unnecessarily. As a result, the air heated or cooled by the air conditioning system of the building is also exhausted to the outside, causing the thermostat of the air conditioner to run the air conditioning system to replace the exhausted air. This resulting inefficiency increases the owner's utility bills and needlessly wastes energy. This situation may also shorten the life of the exhaust fan motor.

Numerous attempts have been made in the past to overcome these difficulties, but they generally add complexity and expense to the ventilation systems. One approach has been to install a fresh air blower with an exhaust vent located near the cooking area, so that outside air is blown into the cooking area to be exhausted along with the cooking by-products instead of the building's air conditioning. Other systems automatically operate the ventilation system in response to detecting smoke or particles emitted from the cooking area. Another suggested method was to vary the speed of the blower system in proportion to the temperature of the air above the cooking units or the level of cooking by-products in the air flow path.

These devices, however, are not entirely adequate to overcome these problems, since they often involve complicated and expensive circuitry and detection devices. Moreover, these detection devices are normally mounted within the vent and are susceptible to damage from the accumulation of grease and small grease fires which sometimes occur within the cooking area. In addition, these detection devices require frequent maintenance to prevent the system from operating improperly or being rendered inoperative due to the accumulation of grease.

Some ventilation systems have attempted to solve the problem of grease accumulation by including devices to wash the chamber and the exhaust duct periodically. In addition, to conform with known safety rules, conventional ventilation systems usually include a safety mechanism designed to prevent the propagation of fires through the exhaust ducts linking the exhaust hood to an external environment. One common safety mechanism consists of a damper that is automatically closed when abnormally elevated temperatures are detected in or near the exhaust duct. A disadvantage of using a damper or blower system cut-off is the fact that the smoke generated by an eventual fire may not be exhausted.

SUMMARY OF THE INVENTION

The present invention provides a method for controlling a ventilation hood apparatus having at least one blower unit disposed within a hood. The method comprises the steps of operating the blower unit at a first speed which is substantially below a threshold speed when a speed controller is in a first setting and a sensor does not detect a trigger condition, operating the blower unit at or above the threshold speed when the speed controller is in a first setting and the sensor detects a trigger condition, operating the blower unit at or above the threshold speed when the speed controller is in a second setting, and deactivating the blower unit when the speed controller is in a third setting.

In addition, the present invention provides a control apparatus for a ventilation hood system having at least one blower unit disposed within a hood. The control apparatus comprises a speed controller having variable settings, such as a first, second and third setting, and a sensor capable of detecting a trigger condition. The speed controller is coupled to the sensor and the blower unit such that the blower unit operates at a first speed which is substantially below a threshold speed when the speed controller is in the first setting and the sensor does not detect the trigger condition, and the blower unit operates at or above the threshold speed when the speed controller is in the first setting and the sensor detects the trigger condition, and the blower unit operates at or above the threshold speed when the speed controller is in the second setting, and the blower unit is deactivated when the speed controller is in the third setting.

The present invention also provides a ventilation hood system for exhausting air containing cooking by-products from a cooking station to an external environment through an exhaust duct. The ventilation hood system comprises a hood, a blower unit and a blower control unit. The hood is of sufficient size and design to hold the cooking by-products prior to removal from the hood. The blower unit is disposed within the hood and capable of removing the cooking by-products from within the hood and liquefying and containing grease. The blower control circuit comprises a speed controller having variable settings, such as a first, second and third setting, and a sensor capable of detecting a trigger condition. The speed controller is coupled to the sensor and the blower unit such that the blower unit operates at a first speed which is substantially below a threshold speed when the speed controller is in the first setting and the sensor does not detect the trigger condition, and the blower unit operates at or above the threshold speed when the speed controller is in the first setting and the sensor detects the trigger condition, and the blower unit operates at or above the threshold speed when the speed controller is in the second setting, and the blower unit is deactivated when the speed controller is in the third setting.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 1A is a perspective view of a ventilation system in accordance with the present invention having a single blower unit shown in a cut away section;

FIG. 1B is a top view of a ventilation system in accordance with the present invention showing the orientation of a single blower unit within the hood;

FIG. 1C is a side view of a ventilation system in accordance with the present invention having a single blower unit;

FIG. 1D is a front view of a single blower unit in accordance with the present invention;

FIG. 2 is a perspective view of a ventilation system in accordance with the present invention showing the orientation of two back-to-back blower units within the hood;

FIG. 3 is a cut away view of a blower unit in accordance with the present invention showing air flow;

DETAILED DESCRIPTION OF THE INVENTION

Figure 4:
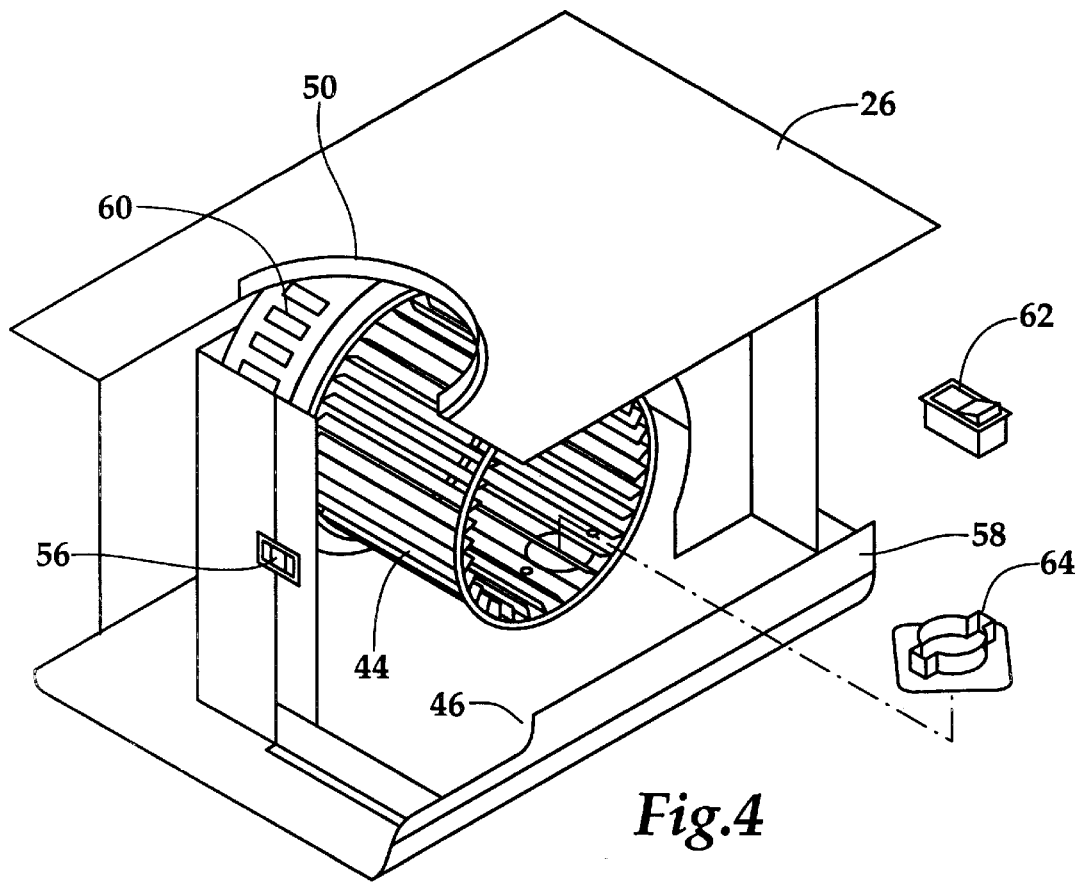
FIG. 4 is a cut away view of a blower unit showing the added control devices in accordance with the present invention.

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention and do not delimit the scope of the invention.

The blower system of the present invention provides a powerful, efficient, safe and quiet kitchen ventilation system that can be installed in a home or commercial setting. This blower system liquefies cooking grease and vapors in the blower and exhausts purified air into the duct. This method of quiet grease extraction from the air is superior to other ventilation systems because no mesh or baffle filters are used to slow the removal of heat polluted air. Moreover, the centrifugal action of the blower unit prevents flames from passing through into the exhaust duct.

FIGS. 1A, 1B, 1C and 1D show a ventilation system 20 having a single blower unit 26 in accordance with the present invention. The ventilation system 20 is shown directly above a cooking area 22. The ventilation system 20 comprises a hood 24, a blower unit 26 having an automatic damper 27 disposed within the hood 24 and a duct 28 for communicating with the outside environment. The hood 24 also includes a light 30. As illustrated in FIG. 1C, the front of the hood 24 may be shaped to suit the user.

FIG. 2 shows a ventilation system 32 having a blower system which comprises two back-to-back blower units 34 in accordance with the present invention shown directly above a cooking area 36. Ventilation system 32 is shown in a cooking island configuration with back-to-back blower units 34 for complete coverage. Each back-to-back blower unit 34 comprises two single blower units 26 connected together. This hood 38 also contains lights 40 which typically use fluorescent, incandescent or halogen bulbs and a furring 42 to connect the hood 38 to the area above the cooking area 36.

The ventilation system 32 of the present invention comprises several primary elements: a hood 38 of sufficient size and design to hold cooking by-products or contaminants prior to removal; one or more blower units 26 capable of effectively removing the cooking by-products including heat, steam, and odors; filtration provided by each blower unit 26 which is capable of liquefying and containing grease produced from cooking; ducting that is properly sized and configured to vent the cooking by-products out of the kitchen. Each blower unit 26 has an automatic damper 27 to prevent any backdraft into the blower unit 26. The combination of these elements along with the control system which is described below provides thorough and safe ventilation of any cooking area 36.

FIG. 3 is a cut away view of a blower unit 26 in accordance with the present invention showing air flow. The centrifugal action of spinning a squirrel cage 44 powerfully separates grease from heated vapors, spinning the grease and other cooking by-products into reservoir 46. A blower speed of approximately 1550 rpm maintains suitable pressure to liquify grease vapor and provide maximum removal of heat-polluted air 52. The pressure created by the squirrel cage 44 prevents flames from entering the by-product reservoir 46 or exhaust duct 48. The ring guard collar 50 allows space for duct work to fit inside to prevent grease from collecting between the top of blower unit 26 and the bottom of the surface to which the ventilation system is attached. The blower unit 26 also contains an automatic damper 27 (FIG. 1A and 2) which prevents any backdraft into the blower unit 26. The parabola design 54 provides a sealed housing where the cooking by-products gather. In addition, the blower unit 26 snaps apart with latches 56 for easy cleaning. The blower unit 26 also includes a shield guard 58 for added safety and to balance vapor intake.

The use of the squirrel cage 44 makes the blower unit 26 "fire safe" by successfully trapping grease and other cooking by-products produced by all types of cooking equipment. The centrifugal force created by the squirrel cage 44 liquifies grease and stores it safely beyond the fireproof pressure barrier. The blower unit liquifies grease at approximately 1550 rpm. The squirrel cage 44 can be easily removed and cleaned in a dishwasher. If a grease fire occurs, the centrifugal pressure created by the blower unit 26 prevents the flame from entering the exhaust duct and thus controls the area affected by the fire. The full covering hood protects the kitchen walls and ceiling as harmful smoke is exhausted outside. The centrifugal pressure also prevents the liquefied grease in the blower unit 26 from being ignited. As a result, the fire can be controlled with minimal damage.

As illustrated in FIG. 1A and 2, there are numerous configurations available to handle all ventilation needs. For example, multiple blowers can be specified in larger hoods covering multiple cooking surfaces or commercial equipment. Remote blowers are also available. Remote blowers require additional air flow (higher cubic feet per minute ("cfm")) due to necessary conventional filtration. Hoods with higher air flow (cfm) have more air noise. Therefore, remote installations will be louder than the in-hood blowers which use centrifugal filtration and require less air flow (cfm).

In addition to being "fire safe," the blower units 26 are very quiet because centrifugal filtration requires less air flow (cfm) than equipment using conventional mesh or baffle filtration. In other words, the blower unit 26 does not have a restrictive filter that increases static pressure and noise while decreasing air flow. In addition, in systems using mesh or baffle filters air flow decreases further as grease accumulates on the filters. Baffle filters are even more restrictive, which greatly reduces air flow and thus requires large blowers. Actual air flow (cfm) is determined by static pressure which includes the (resistance of filters, ducting, etc. Although blower units 26 are rated at various static pressures, the following chart can be used to determine the size and number of blower units 26 necessary for available cooking equipment.

EQUIPMENT RATINGS THAT BLOWERS WILL VENTILATE

| BLOWER | TYPE | BTU (British Thermal Units) | WATTS |
| --- | --- | --- | --- |
| B100 (single) | WALL | 20,000 | 12,000 |
| B200 (dual) | WALL | 40,000 | 24,000 |
| T200 (dual) | ISLAND | 40,000 | 24,000 |
| T400 (cluster) | ISLAND | 80,000 | 48,000 |
| RM500 (remote) | N/A | 20,000 | 12,000 |
| RM1150 (remote) | N/A | 40,000 | 24,000 |

FIG. 4 is a cut away view of a blower unit 26 showing the added control devices in accordance with the present invention. A squirrel cage 44 or forward curve blower wheel is attached to motor 60, which may be a single speed or multi-speed motor. The motor 60 is housed within the blower unit 26. As described in reference to FIG. 3, the cooking by-products are spun into the reservoir 46. The ring guard collar 50 allows space for duct work to fit inside to prevent grease from collecting between top of unit and bottom of the surface to which the ventilation system is attached. The housing of the blower unit 26 snaps apart with latches 56 for easy cleaning. Moreover, the blower system also includes a shield guard 58 for added safety and to balance vapor intake.

The present invention also has a speed controller 62, which may be a selector switch, solid state switch or variable speed control, to operate the motor on HIGH, LOW or OFF. Other motor speeds are possible, such as MEDIUM or various intermediate speeds. The different speeds allow a user to select the amount of ventilation required and thus reduces over-exhausting and the noise level of the blower unit. A sensor 64, such as a single pole, single throw thermostat, is coupled to the speed controller 62 and has normally open contacts that close when a trigger condition occurs, such as a specified temperature rise. Alternatively, the sensor 64 may be a single pole, double throw thermostat with normally open contacts that close, and normally closed contacts that open when the trigger condition occurs. The trigger condition of the sensor is typically set between 122 and 200 degrees Fahrenheit. The actual trigger condition set point varies depending on the sensor's location, the configuration and the heating profile of the cooking equipment and the blower unit used. In addition, the sensor 64 may be located in different areas within the blower unit 26 or hood.

In operation, the speed controller 62 automatically changes the speed of the blower unit 26 to a speed sufficient to liquefy grease, approximately 1550 rpm, when the sensor 64 detects the trigger condition. The present invention can be configured to automatically lower the speed of the blower unit 26 when the sensor 64 no longer detects the trigger condition. Similarly, the present invention can be configured to automatically activate the blower unit 26 at or above the threshold speed when the speed controller is OFF and the sensor 64 detects the trigger condition. The present invention can also be configured to deactivate the blower unit 26 after a defined time period has elapsed.

Figure 5:
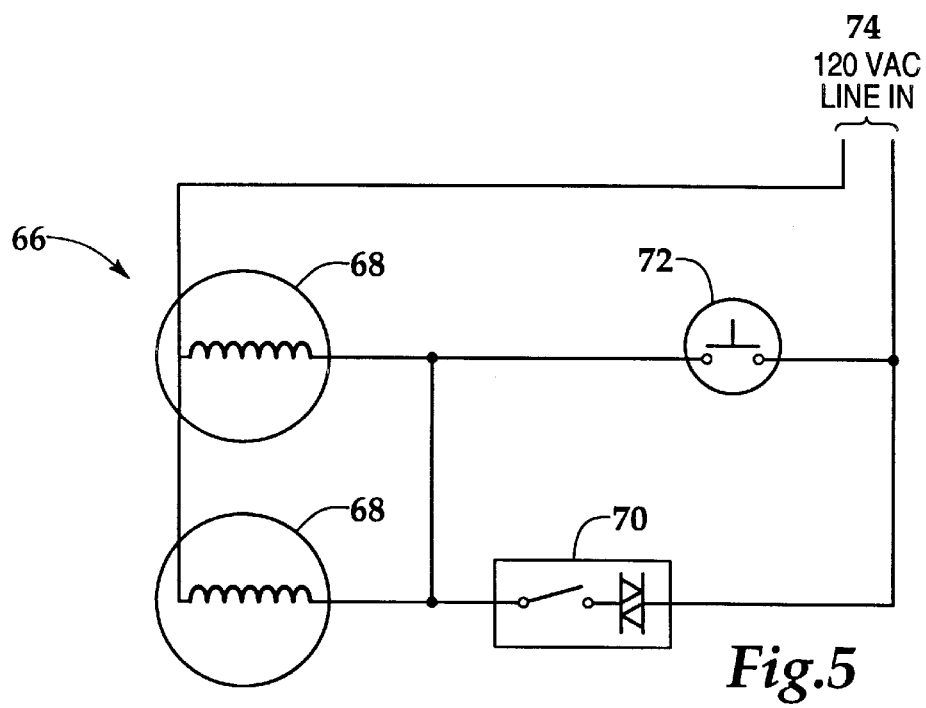
FIG. 5 is a schematic diagram of a control circuit for a single speed motor with a variable speed control and thermostat in accordance with the present invention.
Figure 6:
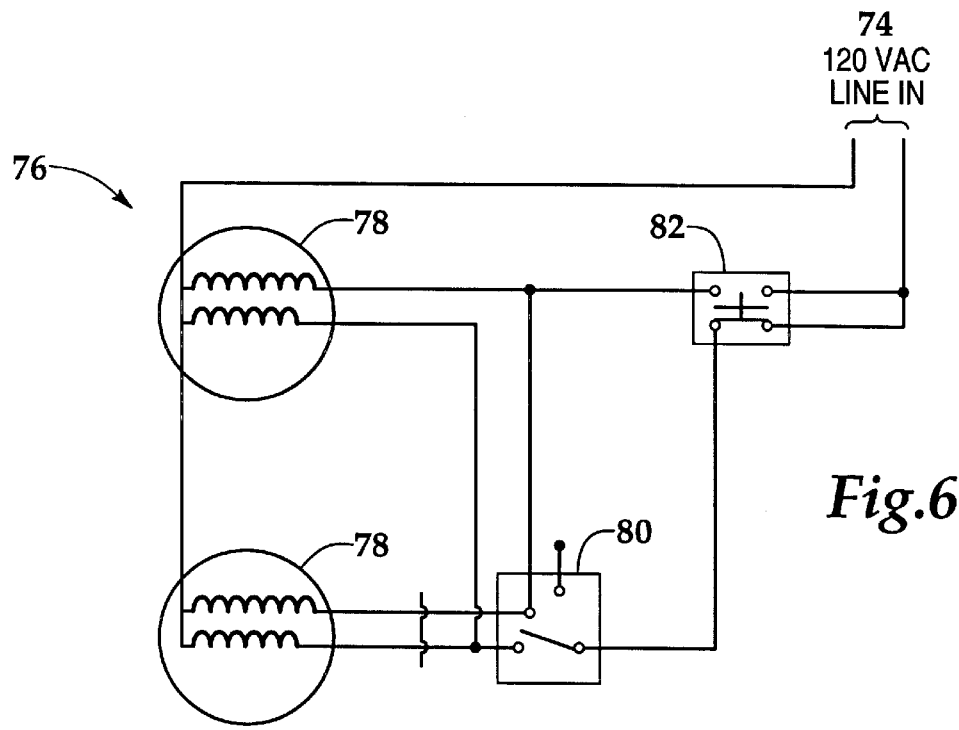
FIG. 6 is a schematic diagram of a control circuit for a two speed motor with a three position switch and thermostat in accordance with the present invention.

As will be illustrated in FIGS. 5–9, the type of motor and control circuit will vary depending on the particular installation. For example, in some installations a single motor with a variable speed control (FIG. 5) may be quieter than dual speed motors with a three position switch (FIG. 6). Accordingly, FIGS. 5–9 illustrate some, but not all, of the configurations possible with the present invention.

FIG. 5 is a schematic diagram of a control circuit 66 for a single speed motor 68 with a variable speed control 70 and thermostat 72 in accordance with the present invention. The control circuit 66 is connected to a 120 volt AC source 74. The variable speed control 70 has an OFF setting and HIGH through LOW settings. The thermostat 72 is a single pole, single throw thermostat with normally open contacts that close on a specified temperature rise. The variable speed control 70 and the thermostat 72 are connected in parallel to one another. This parallel combination 70 and 72 is then connected in series with the motor 68.

FIG. 6 is a schematic diagram of a control circuit 76 for two dual speed motors 78 with a three position switch 80 and a thermostat 82 in accordance with the present invention. The control circuit 76 is connected to a 120 volt AC source 74. The switch 80 is a three position switch having OFF, HIGH and LOW positions. The thermostat 82 is a single pole, double throw thermostat with normally open contacts that close and normally closed contacts that open on a specified temperature rise. The switch 80 is connected in series with one contact and in parallel with the other contact of the thermostat 82. The parallel combination of 80 and 82 is then connected in series with the motors 78.

Figure 7:
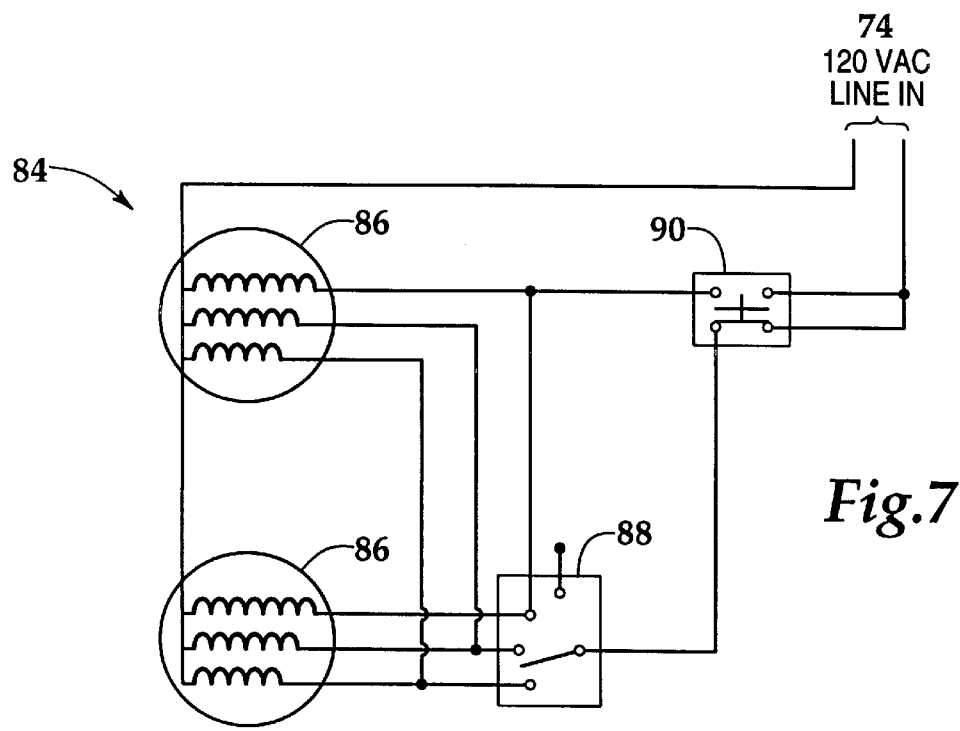
FIG. 7 is a schematic diagram of a control circuit for a three speed motor with a four position switch and thermostat in accordance with the present invention.

FIG. 7 is a schematic diagram of a control circuit 84 for two triple speed motors 86 with a four position switch 88 and thermostat 90 in accordance with the present invention. The control circuit 84 is connected to a 120 volt AC source 74. The switch 88 is a four position switch having OFF, HIGH, MEDIUM and LOW positions. The thermostat 90 is a single pole, double throw thermostat with normally open contacts that close and normally closed contacts that open on a specified temperature rise. The switch 88 and connected in series with one contact and in parallel with the other contact of the thermostat 90. The parallel combination of 88 and 90 is then connected in series with the motors 86.

Figure 8:
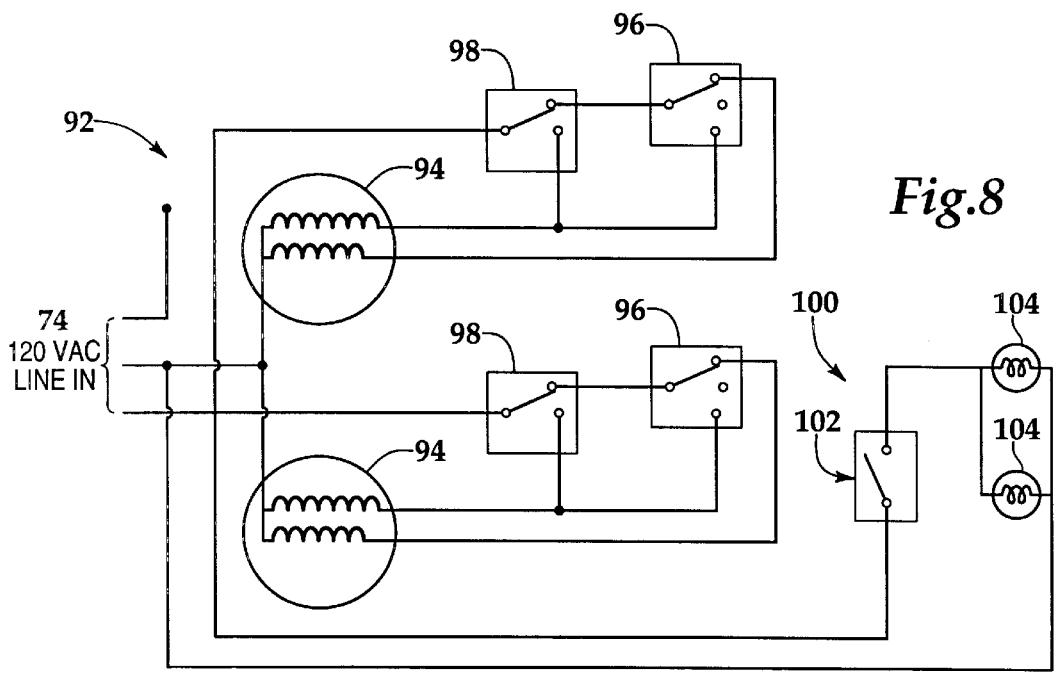
FIG. 8 is a schematic diagram of a control circuit for two dual speed motors with two three-position switches and two thermostats in accordance with the present invention.

FIG. 8 is a schematic diagram of a control circuit 92 for two dual speed motors 94 with two three position switches 96 and two thermostats 98 in accordance with the present invention. The control circuit 92 is connected to a 120 volt AC source 74. The switches 96 are a three position switch having HIGH, OFF and LOW positions. Each switch 96 is a three position switch having HIGH, OFF and LOW positions. Each thermostat 98 is a single pole, double throw thermostat with normally open contacts that close and normally closed contacts that open on a specified temperature rise. Each motor 94 has its own switch 96 and thermostat 98. Each switch 96 is connected in series with one contact and in parallel with the other contact of the corresponding thermostat 98. Each parallel combination of thermostat 98 with switch 96 is then connected in series with the corresponding motor 94. In addition, FIG. 8 illustrates a light control circuit 100 connected to the 120 volt AC source 74. The light control circuit 100 includes a light switch 102 connected to lights 104.

Figure 9:
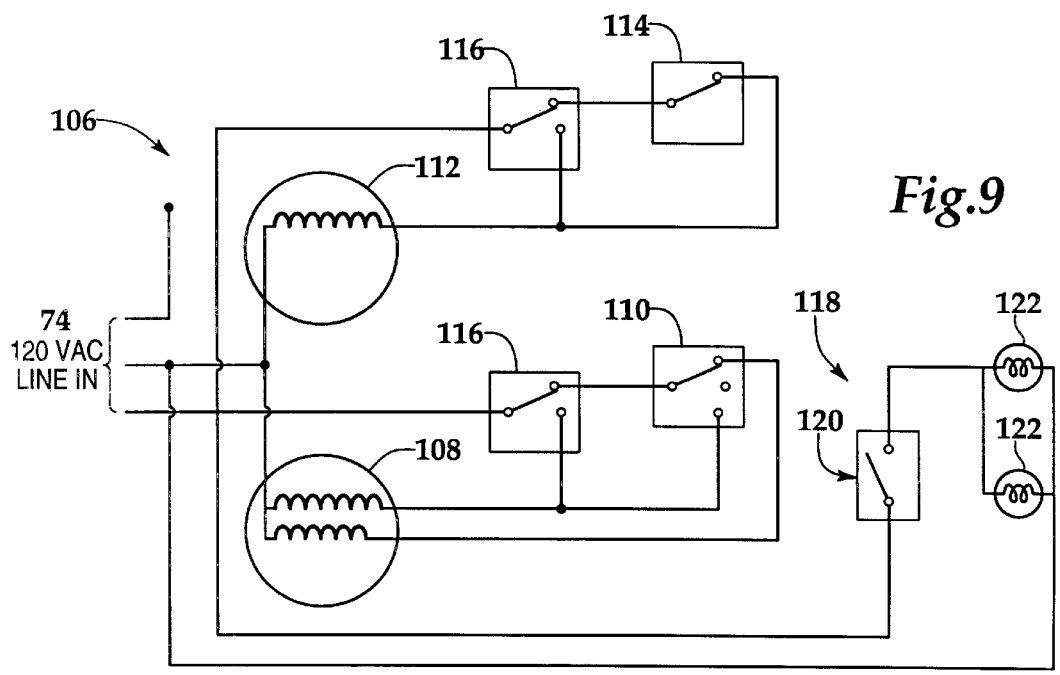
FIG. 9 is a schematic design of a control circuit for one dual speed motor with a three position switch, one single speed motor with a two position switch and two thermostats in accordance with the present invention.

FIG. 9 is a schematic diagram of a control circuit 106 for one dual speed motor 108 with a three position switch 110, one single speed motor 112 with a two position switch 114, and two thermostats 116 in accordance with the present invention. The control circuit 106 is connected to a 120 volt AC source 74. The three position switch 110 has HIGH, OFF and LOW positions. The two position switch 114 has ON and OFF positions. Each thermostat 116 is a single pole, double throw thermostat with normally open contacts that close and normally closed contacts that open on a specified temperature rise. Each switch 110 and 114 is connected in series with one contact and in parallel with the other contact of the corresponding thermostat 116. Each parallel combination of thermostat 116 with switch 110 and 114, respectively, is then connected in series with the corresponding motor 108 and 112. In addition, FIG. 9 illustrates a light control circuit 118 connected to the 120 volt AC source 74. The light control circuit 118 includes a light switch 120 connected to lights 122.

Although preferred embodiments of the invention have been described in detail, it will be understood by those skilled in the art that various modifications can be made therein without departing from the spirit and scope of the invention as set forth in the appended claims.

What is claimed is:

1. A method for controlling a ventilation hood apparatus having at least one blower unit disposed within a hood, the method comprising the steps of:
    operating the blower unit at a first speed which is substantially below a threshold speed when a speed controller is in a first setting and a sensor does not detect a trigger condition;
    operating the blower unit at or above the threshold speed when the speed controller is in the first setting and the sensor detects a trigger condition;
    operating the blower unit at or above the threshold speed when the speed controller is in a second setting; and
    deactivating the blower unit when the speed controller is in a third setting.

2. The method as recited in claim 1, further comprising the steps of:
    operating the blower unit at a second speed which is in between the first speed and the threshold speed when the speed controller is in a fourth setting and the sensor does not detect the trigger condition; and
    operating the blower unit at or above the threshold speed when the speed controller is in the fourth setting and the sensor detects a trigger condition.

3. The method as recited in claim 1, further comprising the step of activating and operating the blower unit at or above the threshold speed when the speed controller is in the third setting and the sensor detects the trigger condition.

4. The method as recited in claim 1, wherein the blower unit is deactivated after a defined time period has elapsed.

5. The method as recited in claim 4, wherein the time period is defined by the temperature within the hood.

6. The method as recited in claim 1, wherein the first setting operates the blower unit at a low speed, the second setting operates the blower unit at a high speed and the third setting turns the blower unit off.

7. The method as recited in claim 1, wherein the threshold speed is the point at which the blower unit liquefies grease.

8. The method as recited in claim 1, wherein the threshold speed corresponds to operating the blower unit at approximately 1550 rpm.

9. The method as recited in claim 2, wherein the fourth setting operates the blower unit at a medium speed.

10. The method as recited in claim 1, wherein the sensor is a temperature sensor.

11. The method as recited in claim 10, wherein the trigger condition is between 122 and 200 degrees Fahrenheit.

12. The method as recited in claim 1, wherein the sensor is a thermostat.

13. The method as recited in claim 12, wherein the thermostat has a fixed set point.

14. The method as recited in claim 1, wherein the speed controller is a multiple position switch.

15. The method as recited in claim 1, wherein the speed controller is a variable speed control.

16. A control apparatus for a ventilation hood system having at least one blower unit disposed within a hood, the apparatus comprising:
    a speed controller having a first, second and third settings;
    a sensor capable of detecting a trigger condition;
    the speed controller is coupled to the sensor and the blower unit such that the blower unit operates at a first speed which is substantially below a threshold speed when the speed controller is in the first setting and the sensor does not detect the trigger condition, and the blower unit operates at or above the threshold speed when the speed controller is in the first setting and the sensor detects the trigger condition, and the blower unit operates at or above the threshold speed when the speed controller is in the second setting, and the blower unit is deactivated when the speed controller is in the third setting.

17. The control apparatus as recited in claim 16, wherein the speed controller is further coupled to the sensor and the blower unit such that the blower unit operates at a second speed which is in between the first speed and the threshold speed when the speed controller is in a fourth setting and the sensor does not detect the trigger condition, and the blower unit operates at or above the threshold speed when the speed controller is in the fourth setting and the sensor detects the trigger condition.

18. The control apparatus as recited in claim 16, wherein the speed controller is further coupled to the sensor and the blower unit such that the blower unit activates and operates at or above the threshold speed when the speed controller is in the third setting and the sensor detects the trigger condition.

19. The control apparatus as recited in claim 16, wherein the speed controller is further coupled to the sensor and the blower unit such that the blower unit is deactivated after a defined time period has elapsed.

20. The control apparatus as recited in claim 19, wherein the time period is defined by the temperature within the hood.

21. The control apparatus as recited in claim 16, wherein the first setting operates the blower unit at a low speed, the second setting operates the blower unit at a high speed, and the third setting turns the blower unit off.

22. The control apparatus as recited in claim 16, wherein the threshold speed is the point at which the blower unit liquefies grease.

23. The control apparatus as recited in claim 16, wherein the threshold speed corresponds to operating the blower unit at approximately 1550 rpm.

24. The control apparatus as recited in claim 17, wherein the fourth setting operates the blower unit at a medium speed.

25. The control apparatus as recited in claim 16, wherein the sensor is a temperature sensor.

26. The control apparatus as recited in claim 25, wherein the trigger condition is between 122 and 200 degrees Fahrenheit.

27. The control apparatus as recited in claim 16, wherein the sensor is a thermostat.

28. The control apparatus as recited in claim 27, wherein the thermostat has a fixed set point.

29. The control apparatus as recited in claim 16, wherein the speed controller is a multiple position switch.

30. The control apparatus as recited in claim 16, wherein the speed controller is a variable speed control.

31. A ventilation hood system for exhausting air containing cooking by-products from a cooking station to an external environment through an exhaust duct, said ventilation hood system comprising:
   a hood;
   a blower unit disposed within the hood and capable of removing the cooking by-products from within the hood and liquefying and containing grease;
   a control circuit comprising a speed controller having a first, second and third settings and a sensor capable of detecting a trigger condition; and
   the speed controller is coupled to the sensor and the blower unit such that the blower unit operates at a first speed which is substantially below a threshold speed when the speed controller is in the first setting and the sensor does not detect the trigger condition, and the blower unit operates at or above the threshold speed when the speed controller is in the first setting and the sensor detects the trigger condition, and the blower unit operates at or above the threshold speed when the speed controller is in the second setting, and the blower unit is deactivated when the speed controller is in the third setting.

32. The ventilation hood system as recited in claim 31, wherein the speed controller is further coupled to the sensor and the blower unit such that the blower unit operates at a second speed which is in between the first speed and the threshold speed when the speed controller is in a fourth setting and the sensor does not detect the trigger condition, and the blower unit operates at or above the threshold speed when the speed controller is in the fourth setting and the sensor detects the trigger condition.

33. The ventilation hood system as recited in claim 31, wherein the speed controller is further coupled to the sensor and the blower unit such that the blower unit activates and operates at or above the threshold speed when the speed controller is in the third setting and the sensor detects the trigger condition.

34. The ventilation hood system as recited in claim 31, wherein the speed controller is further coupled to the sensor and the blower unit such that the blower unit is deactivated after a defined time period has elapsed.

35. The ventilation hood system as recited in claim 31, wherein the time period is defined by the temperature within the hood.

36. The ventilation hood system as recited in claim 31, wherein the first setting operates the blower unit at a low speed, the second setting operates the blower unit at a high speed, and the third setting turns the blower unit off.

37. The ventilation hood system as recited in claim 31, wherein the threshold speed is the point at which the blower unit liquefies grease.

38. The ventilation hood system as recited in claim 31, wherein the threshold speed corresponds to operating the blower unit at approximately 1550 rpm.

39. The ventilation hood system as recited in claim 32, wherein the fourth setting operates the blower unit at a medium speed.

40. The ventilation hood system as recited in claim 31, wherein the sensor is a temperature sensor.

41. The ventilation hood system as recited in claim 40, wherein the trigger condition is between 122 and 200 degrees Fahrenheit.

42. The ventilation hood system as recited in claim 31, wherein the sensor is a thermostat.

43. The ventilation hood system as recited in claim 42, wherein the thermostat has a fixed set point.

44. The ventilation hood system as recited in claim 31, wherein the speed controller is a multiple position switch.

45. The ventilation hood system as recited in claim 31, wherein the speed controller is a variable speed control.

* * * * *